(12) United States Patent
Thogersen et al.

(10) Patent No.: US 10,228,188 B2
(45) Date of Patent: Mar. 12, 2019

(54) METHOD FOR REAL-TIME PERFORMANCE CHECK OF CONTAINER SYSTEM

(71) Applicant: Maersk Container Industry A/S, Tinglev (DK)

(72) Inventors: Ole Thogersen, Nyborg (DK); Torkild Folmer Pedersen, Aabenraa (DK)

(73) Assignee: MAERSK CONTAINER INDUSTRY A/S, Tinglev (DK)

( * ) Notice: Subject to any disclaimer, the term of this patent is extended or adjusted under 35 U.S.C. 154(b) by 154 days.

(21) Appl. No.: 15/178,125

(22) Filed: Jun. 9, 2016

(65) Prior Publication Data

US 2017/0356778 A1    Dec. 14, 2017

(51) Int. Cl.

| | |
|---|---|
| *G01F 1/86* | (2006.01) |
| *F25D 29/00* | (2006.01) |
| *G01K 15/00* | (2006.01) |
| *F25D 11/00* | (2006.01) |
| *F25B 1/10* | (2006.01) |

(Continued)

(52) U.S. Cl.
CPC .............. *F25D 29/008* (2013.01); *F25B 1/10* (2013.01); *F25B 47/022* (2013.01); *F25B 49/005* (2013.01); *F25D 11/003* (2013.01); *F25D 29/003* (2013.01); *G01F 1/68* (2013.01); *G01F 25/0007* (2013.01); *G01K 15/007* (2013.01); *F25B 49/02* (2013.01); *F25B 2400/01* (2013.01); *F25B 2400/13* (2013.01); *F25B 2700/1931* (2013.01); *F25B 2700/1933* (2013.01); *F25B 2700/21151* (2013.01); *F25B 2700/21152* (2013.01); *F25B 2700/21172* (2013.01); *F25B 2700/21173* (2013.01); *F25B 2700/21174* (2013.01);

(Continued)

(58) Field of Classification Search
USPC .......................................................... 702/45
See application file for complete search history.

(56) References Cited

U.S. PATENT DOCUMENTS 4,407,141 A * 10/1983 Paddock ................. F25D 29/00
  236/94
5,079,930 A *  1/1992 Beaverson .............. F25B 40/02
  62/129

(Continued)

*Primary Examiner* — Paul D Lee
(74) *Attorney, Agent, or Firm* — Brinks Gilson & Lione

(57) ABSTRACT

The invention relates to a method for real-time performance check of transport refrigeration units comprising the steps of:
  comparing via controller temperature sensors by pairs and determining from these comparisons by pairs if one or more temperature sensors are defective or in some extent deviates from expected temperature readings;
  at the same time measuring/monitoring the mass flow of cooling agent through a compressor and through an evaporator expansion valve $V_{exp}$ which the controller by comparison determines if mass flow through the compressor do not deviate more than 25% from the mass flow through that evaporator expansion valve $V_{exp}$;
  if said deviation of mass flow through the compressor is more than 25% different from said mass flow through the expansion device $V_{exp}$, an error signal is provided.

18 Claims, 15 Drawing Sheets

(51) Int. Cl.
*F25B 47/02* (2006.01)
*F25B 49/00* (2006.01)
*G01F 25/00* (2006.01)
*G01F 1/68* (2006.01)
*F25B 49/02* (2006.01)

(52) U.S. Cl.
CPC ...... *F25D 2400/36* (2013.01); *F25D 2700/12* (2013.01); *G01F 1/86* (2013.01)

(56) References Cited

U.S. PATENT DOCUMENTS

| | | | | |
|---|---|---|---|---|
| 5,433,086 | A | * | 7/1995 | Cho ................ F25D 17/065 62/275 |
| 5,732,561 | A | * | 3/1998 | Kim ................ F25D 17/065 62/187 |
| 6,044,655 | A | * | 4/2000 | Ozaki ................ F25B 9/008 62/205 |
| 8,769,976 | B2 | * | 7/2014 | Thybo ................ F25B 5/02 62/115 |
| 9,097,456 | B2 | | 8/2015 | Thögersen et al. |

* cited by examiner

METHOD FOR REAL-TIME PERFORMANCE CHECK OF CONTAINER SYSTEM

TECHNICAL FIELD

The invention relates in general to transport refrigeration units, and more specifically to a method for real-time performance check of transport refrigeration units.

BACKGROUND ART

In order to ensure proper functioning of a refrigeration unit for an intermodal container normally a pre-trip inspection (PTI) is carried out. Such a pre-trip inspection comprises inspection and testing of different structural components of the container and its refrigeration unit before cargo are loaded into the container, thereby ensuring that only containers passing the inspection and passing the test are used. As documentation a pre-trip inspection report is carried out.

Hereby a record is made, that this particular container is suitable for at least the next trip.

U.S. Pat. No. 9,097,456 discloses a method for in-service testing where each component to be tested in the in-service diagnostic testing is tested at a time where the test does not intervene in the normal operation of the climate control system. The power consumption of individual components of the climate control system is determined, preferably both in an activated state and in a deactivated state, where the determined power consumption is compared to a nominal value. Excessive deviations from a nominal value may indicate component failure and should be handled accordingly.

Different needs for cooling relates to goods or cargo to be transported within a reefer container. Some cargo is sensitive to too high temperature and some cargo is sensitive to temperatures too low. Examples can be frozen cargo which must be transported without risk to thaw and cargo consisting of fresh fruit, vegetables or the like, which should be kept at a chilled condition and avoid freezing.

It is therefore important to check if the cooling equipment is capable of maintaining the right conditions for the cargo during transport.

SUMMARY OF THE INVENTION

The purpose with the invention is to minimize or avoid the necessity of traditional periodical and random Pre-Trip Inspection of a transport refrigeration unit of a container.

This can be achieved by real time performance checks of the container system.

The tests are performed for a group of components at a time during normal use of the container.

Some of the components can only be tested when running in idle mode or in no-load condition.

The cooling system is provided to be operable running on external power and if external power is for some reason cut of or accidental missing for a period, the controller of system can be safely shut down by use of battery power at least in a time period long enough for the controller to store selected values.

The tests are performed in cycles ensuring that the complete system is tested during use (transport), when the system is running on external power.

All sub functions with associated components and additional equipment such as systems for controlling the composition of the atmosphere within the container compartment, systems for ventilation, systems for reducing or eliminating growth of bacterial cultures or similar systems.

The method ensures that all components are tested regardless of mode of operation or the operating situation:

Normal operation with or without cargo, where individual systems, groups of systems or groups of components, emergency functions and/or emergency systems are checked. Examples can be: cooling/heating system, Controlled Atmosphere system (CA), Automatic Ventilation, Bluezone System (systems for reducing or eliminating growth of bacterial cultures), or sensors related to emergency or function.

Compressor and valves are checked for faults in real-time using sensor substitution or FDIH (Fault, Detection, Identification, Handling)

FDIH check of temperature sensors in real-time

Test of combinations of groups:

I) $T_c$ ($P_{dis}$), High Pressure, $T_{amb}$
II) $T_{suc}$, $T_{evap}$, $T_{sup1/2}$, $T_0$ ($P_{suc}$)
III) $V_{eco}$ operating dependent test having surveillance of consumption for determination of difference in power consumption
IV) $M_{evap}$, $M_{cond}$, $H_{evap}$, ($M_{pump}$ & $H_{pump}$) having surveillance of consumption for determination of difference in power consumption.
V) Check hot gas valve
VI) Check CA system
VII) Check Bluezone System
VIII) Check RH, $CO_2$ and $O_2$ sensors
IX) Check Fresh air system
X) Check Frequency converter Start and stop of test depends on test condition and operation mode ($T_{set}/T_{amb}$).

The controller/display will indicate if one or more components were failing during last transport and thereby will require particular inspection and/or repair before the container can be ready for the next cargo.

Using the above tests the customer/owner of the container do not need to spend about 2.5 h on a Pre-Trip Inspection (PTI) to check if the container is ready for the next cargo. Besides spending time on such a PTI, the inspection will cost an amount of money, which amount can now be saved.

Another advantage is that the controller/display will let the user be aware if one or more components are worn, but not yet has failed. Thereby it is possible to avoid or reduce loss of cargo due to a failing cooling/heating system or appurtenant components.

The frequency converter can be checked during operation if pre-defined conditions are met, for example with full cooling capacity during high operating temperatures, such as high ambient temperatures ($T_{amb}$) and high temperatures for supply air ($T_{sup}$) or return air ($T_{ret}$), a significant lower setpoint temperature ($T_{set}$) as well as a high heat emission from the cargo. As an example the setpoint temperature can be 20° C. lower than the temperature of the cargo. A high temperature can for example be 25° C. or above both for ambient temperatures and/or temperatures within the container.

Considering these conditions, the internal temperature ($T_{fc}$) of the frequency converter is monitored together with the alarm signals from the frequency converter itself.

In case of alarm signals from the drive, the temperature internal in the drive can be raised up to a level near, on level or above level for triggering of an alarm signal to check if the frequency converter indicates an alarm.

Same check can be carried out for power consumption under equally advantageous conditions.

This check is carried out to test for example soldering in circuits, which soldering can cause faulty connections during heavy load conditions. Such conditions can occur caused by high temperatures. An advantageous condition for the test/check is high temperatures to detect possible "electric wear" in the electric circuits. An example of "electric wear" can be small cracks especially in the soldering due to repeated heating and cooling of the conductors.

High temperatures are not considered advantageous conditions for the cooling process.

Briefly, the present invention is a method of operating a transport refrigeration unit comprising a controller for controlling refrigeration unit and thereby the temperature of a conditioned space to a selected set point temperature. The controller operating the unit during controlling the temperature of a served space.

BRIEF DESCRIPTION OF THE DRAWINGS

The invention will become more apparent by reading the following detailed description in conjunction with the drawings, which are shown by way of example only, wherein:

FIG. 3b schematically shows a layout for another embodiment of a test as mentioned under FIG. 3a;

DESCRIPTION OF PREFERRED EMBODIMENTS

Figure 1:
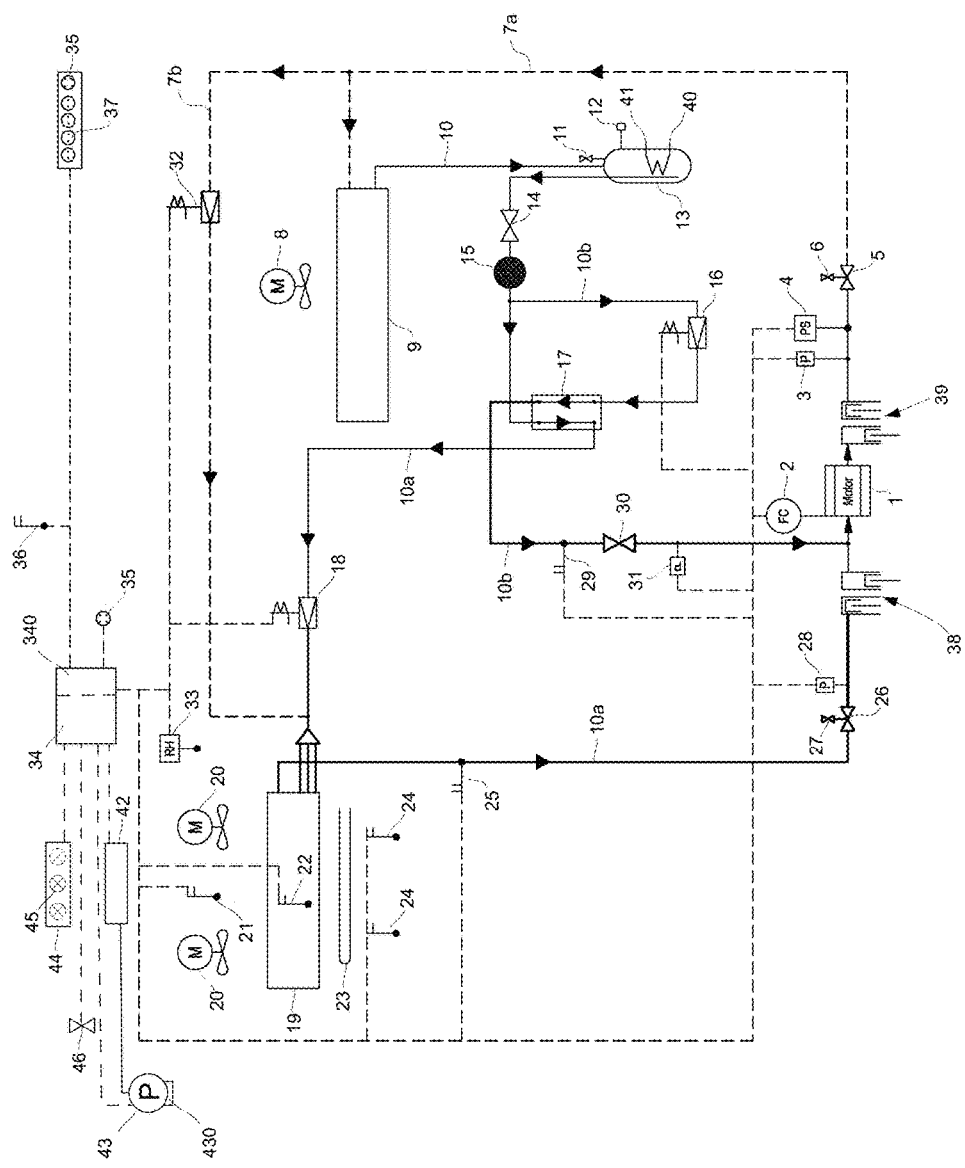
FIG. 1 schematically shows a layout for a refrigeration- and/or heating system for a transport refrigeration unit to an intermodal transportation container.

Referring now to the drawing and to FIG. 1 in particular, a layout of a refrigeration- and/or heating system for a transport refrigeration unit to an intermodal transportation container (not shown) comprises a compressor 1 having a low pressure stage 38 and a high pressure stage 39 and connected to a frequency converter 2. The compressor 1 is fluidly connected to a discharge line 7a for refrigerant to a cooling system, to which line 7a is further connected a discharge pressure transmitter ($P_{dis}$) 3, a high pressure switch 4 and a discharge service switch 5 comprising an evacuation point 6. Evacuation points are used for evacuating air before charging with refrigerant and to charge, refill, top up and retrieve refrigerant. The discharge line 7a leads the refrigerant to a condenser 9, which condenser 9 can be cooled by air from a condenser fan 8. When the refrigerant is at least partly liquefied in the condenser 9, the refrigerant is lead via a liquid line 10 to a receiver in shape of a water cooled condenser 13. The receiver 13 is provided with a water inlet 41 and a water outlet 40 for cooling water, and the receiver can also be provided with an air release valve 11 for releasing air in case of air trapped in the refrigerant circuit The air release valve 11 has a function similar to the evacuation points. The air release valve 11 is used for evacuating air before charging refrigerant. If a small amount of air is mixed in the refrigerant, this air can be layer separated in the receiver 13 during standstill and the air at the top can be released through the air release valve 11. Further the receiver can be provided with a fusible plug 12 for a safety function, if the pressure exceeds 100° C. (40 bar) the centre of the fusible plug will melt and the refrigerant will be released to the atmosphere.

When the refrigerant is liquefied and leaves the receiver 13, the refrigerant passes via a service valve 14 through a drying filter 15 and further into an economizer 17. After the drying filter 15, the liquid line 10 is divided into two lines, one line 10a passing through the economizer and further through an evaporator 19 and further to the low pressure stage 38 of the compressor 1. Another line 10b passes via an economizer expansion valve ($V_{eco}$) 16 through the economizer 17 and back to the compressor 1, where the fluid is entered between the low pressure stage 38 and the high pressure stage 39.

The liquid line 10a leads liquefied refrigerant from the economizer 17 to the evaporator 19 through an electronical expansion valve ($V_{exp}$) 18. One or more evaporator fans 20 provide airflow over an outer side of a cooling surface (not shown) of the evaporator 19 in order to cool the airflow down passing over the cooling surface. In case ice is formed on the cooling surface of the evaporator 19, one or more heating elements 23 are placed below the evaporator 19 to be able to thaw ice if formed.

On a pressure side of the airflow a temperature sensor ($T_{ret}$) 21 is provided to measure temperature of return air from the container. A temperature sensor ($T_{evap}$) 22 is provided in relation to the evaporator 19 in order to measure temperature in the evaporator 19.

Further one or more temperature sensors ($T_{sup}$) 24 is placed on a side of the evaporator 19 from where air is supplied to the container, in order to cool down cargo room of the container or heating the cargo room if needed.

When the refrigerant leaves the evaporator 19 through the liquid line 10a on a suction side of the low pressure stage 38 of the compressor 1, it passes a suction temperature sensor ($T_{suc}$) 25, a suction service valve 26 having an evacuation point 27 and a suction pressure transmitter ($P_{suc}$) whereby the refrigerant is returned to the compressor 1.

The liquid line 10b leads liquefied refrigerant from the economizer 17 to the compressor 1 passing an economizer suction temperature sensor ($T_{eco}$) 29, a economizer suction valve 30 and an intermediate pressure transmitter ($P_{eco}$) 31 before returning to the compressor 1 between the low pressure stage 38 and the high pressure stage 39.

The discharge line 7a is provided with a hot gas valve ($V_{hg}$) 32 in a branch 7b of the discharge line 7a, which branch 7b bypasses the condenser 9, receiver 13 and economizer 17 by leading hot gas refrigerant directly to the evaporator 19, when the hot gas valve 32 is open. This can be used when heat should be supplied to the evaporator 19 in order to supply additional heating in defrost mode. During defrost the heaters 23 apply heat to outside of the evaporator 19 and the hot gas bypass 7b apply heat to the inner side of the evaporator 19.

In an embodiment the heat supplied by the hot gas bypass 7b through the hot gas valve 32 can be used to supply heat into the cargo room in the container.

Further the system is provided with a humidity sensor (Rh) 33 for sensing the humidity within the cargo room of the container.

An ambient temperature sensor ($T_{amb}$) 36 is provided for the possibility of relating ambient temperature to readings from one or more temperature and/or pressure sensors in the system.

Signals and data from the sensors are processed in a controller 34, which controller can be connected to a plug 37 having a number of sockets for receiving plugs from additional sensors, for example cargo sensors (not shown).

The controller 34 as well as the plug 37 can be provided with a communication slot 35 for communication with other units.

One or more modules 42, called CA modules, for providing controlled atmosphere (CA) within the container, is connected in order to be controlled by the controller. To the one or more CA modules 42 a vacuum pump 43 is fluidly connected and controlled by the controller 34. The one or more CA modules 42 comprises a membrane or a material acting like a membrane, which in cooperation with the vacuum pump 43 can remove oxygen from the cargo room or interior of the container and lead the removed oxygen to ambient atmosphere. To ensure lubrication oil in the vacuum pump 43 to be sufficiently fluent in order to keep up its lubricating properties, the vacuum pump 43 is provided with a heater 430 for heating the lubricating oil. The heater 430 can with advantage be placed near a reservoir for the oil.

To be able to prolonging shelf life of for example transported fruits, a system called a Bluezone System is provided. The system has mainly two functionalities. One is control of ethylene gas concentration, which acts as a ripening catalyst and is produced by the fruits. Another functionality is effective destruction of airborne mold spores.

The Bluezone System 44 can be embedded in a module comprising the evaporator 19 and can be vented by the existing evaporator fans 20.

The Bluezone System is provided by a box 44 comprising a number of lamps 45 in shape of bulbs or tubes which can be combined UVC and ozone lamps. The lamps 45 are generating UVC light, which light "kills" for example fungal spores and germ. The lamps 45 also generate ozone, which is extremely oxidizing and depletes effectively volatile organic components (VOC) including ethylene.

The Bluezone System 44 comprises a catalytic converter (not shown) for degrading ozone in the air leaving the box 44. Thereby the air leaving the box 44 is almost ozone free, and reduces effectively influence from ozone to the cargo.

The Bluezone System 44 is controlled by a Bluezone controller 340, which Bluezone controller 340 can be placed near the main controller 34 or as a part of the main controller 34. The Bluezone controller 340 can also be placed in communication with and between the Bluezone System 44 and the main controller 34.

The system can also be provided with a fresh air module 46. The fresh air module 46 comprises a motor (not shown) for operating a valve (not shown) or throttle (not shown), which motor is also controlled by the controller 34. The motor can be a step motor. When operating the fresh air module 46, fresh air can be provided to the cargo room of the container.

In a simple embodiment the fresh air module 46 can be a valve controlled by the controller 34.

The control function of the system is active when the controller is ON, regardless if the cooling/heating control is active or inactive.

At any given time, the completion time for the real-time inspection can be selected or changed in an interval from a minimum time to a maximum time. The selected time interval is used as a limitation of the time for the function to finish a complete check or inspection of all components or functions.

When all components and/or functions are checked and the earlier selected time limit has not been exceeded, a positive signal is provided to one or more communication protocols. In case a test is not positive or if the time limit is exceeded before all components and/or functions is checked, regardless of earlier results, possibly positive signals are removed and a possible alarm signal is provided.

Test of components or functions are executed either during operation, activated automatically or by manual activation of Function Test (FT).

By automatic activation, all outstanding tests of components or functions are carried out if all conditions for the execution of the tests are met.

Figure 2:
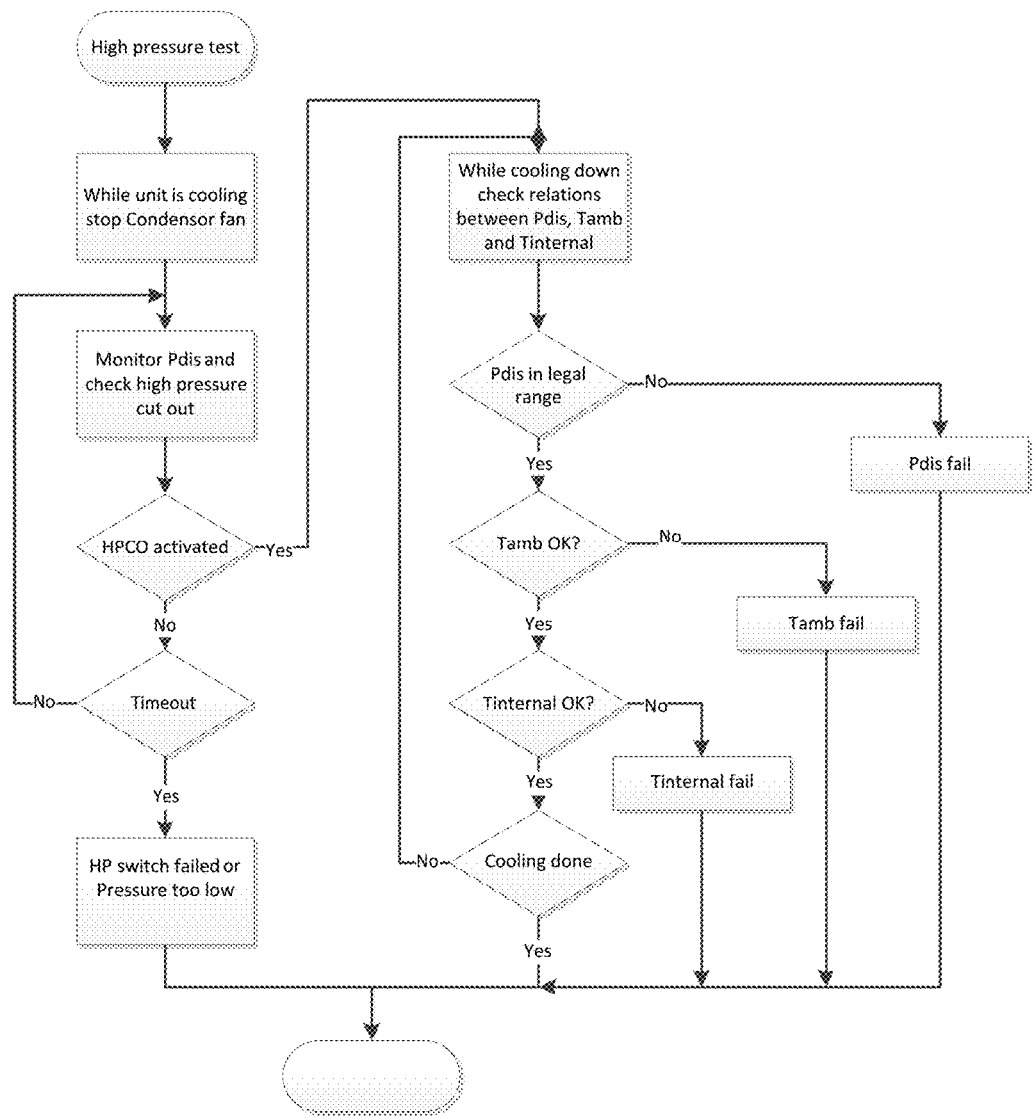
FIG. 2 schematically shows a layout for a test of High Pressure Group, which involves condenser pressure sensor ($P_{dis}$), high pressure switch (emergency equipment) and temperature sensors for the ambient temperature and controller print board.

The individual tests can be carried out as individual tests or in combinations in relation to the individual mode of operation, for example:

FIG. 2: Test of High Pressure Group, which involves condenser pressure sensor ($P_{dis}$) 3, high pressure switch 4 (emergency equipment) and temperature sensors 36 for the ambient temperature and controller print board, which is carried out by stopping the condenser fan 8 either during a normal cooling situation or by an In-Range situation, which In-Range situation has temperature set point and actual air temperature in the cargo within 1.5° C., where by use of the cooling circuit, the condenser temperature is raised to a level activating the high pressure switch 4. At the same time the condenser pressure sensor $P_{dis}$ is measured and following the condenser is cooled to a level, depending on the mode of operation, whereby the temperature sensors $T_{amb}$ and $T_{internal}$ are compared in relation to each other. Hereby it is possible to detect a fault either in the system or in one or more of the sensors, if one or more sensors gives readings deviating from the expected level compared to the rest of the sensors in a one to one relations comparison.

In an embodiment $P_{suc}$ is converted to temperature and is then called $T_0$.

The evaporation temperature $P_{suc}$ ($T_0$) is crucial for the system to operate reliably as this pressure will always be the lowest temperature measured in the refrigeration circuit, when the compressor is running. If any or all of the other temperature sensors are lower than $P_{suc}$ ($T_0$), then there is an error. The error can be determined depending on how many sensors are lower than $P_{suc}$ ($T_0$), if two or more sensors are lowest, then $P_{suc}$ transmitter is not measuring correctly, which could be caused by wrong supply voltage, faulty controller, wires or plugs not properly connected, transmitter broken or a foreign object restricting proper measurement of the transmitter.

Figure 3A:
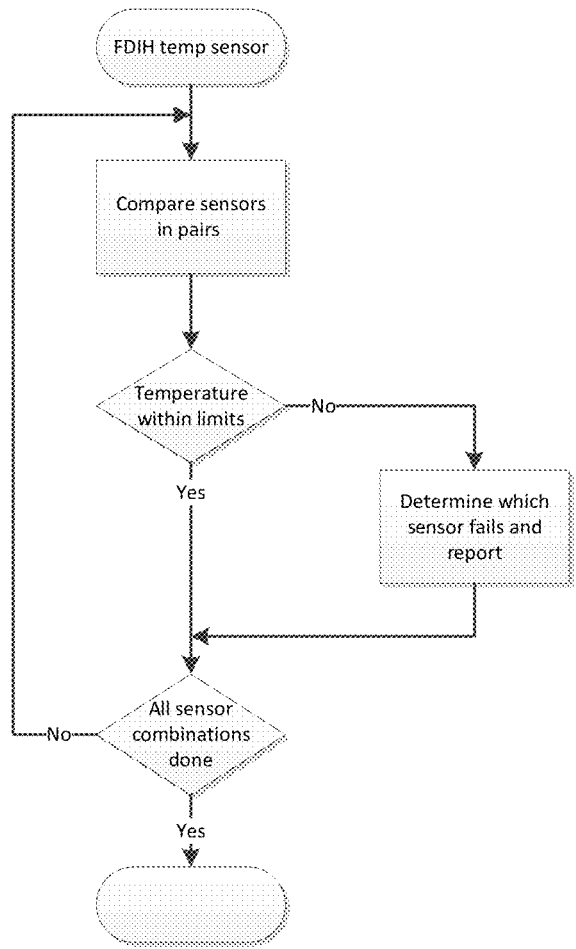
FIG. 3a schematically shows a layout for a test of temperature sensors in real-time and measuring/monitoring at the same time a mass flow of cooling agent through compressor and evaporator expansion valve.
Figure 3B:
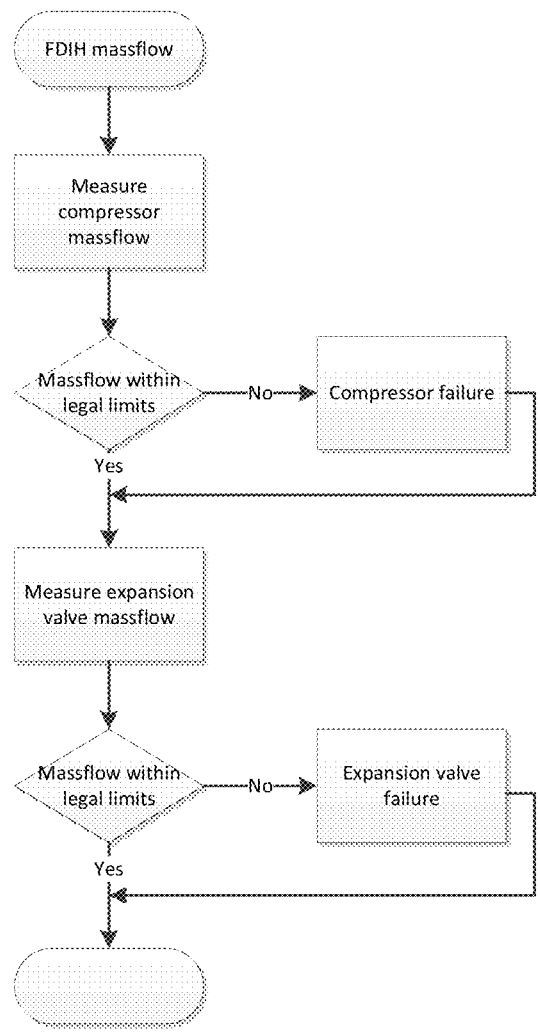

FIGS. 3a and 3b: The FDIH function (Fault, Detection, Identification, Handling) is a real-time monitoring of relations between the temperature sensors, where the controller compares the temperature sensors by pairs and determines from these comparisons by pairs if one or more temperature sensors are defective or in some extent deviates from expected temperature readings. This system measures/monitors at the same time the mass flow of cooling agent through the compressor 1 and through the evaporator expansion valve $V_{exp}$ 18 which the controller 34 by comparison determines if mass flow through the compressor 1 do not deviate more than 25% from the mass flow through that evaporator expansion valve $V_{exp}$ 18. If a deviation exceeds 25% a fault is detected.

Figure 4:
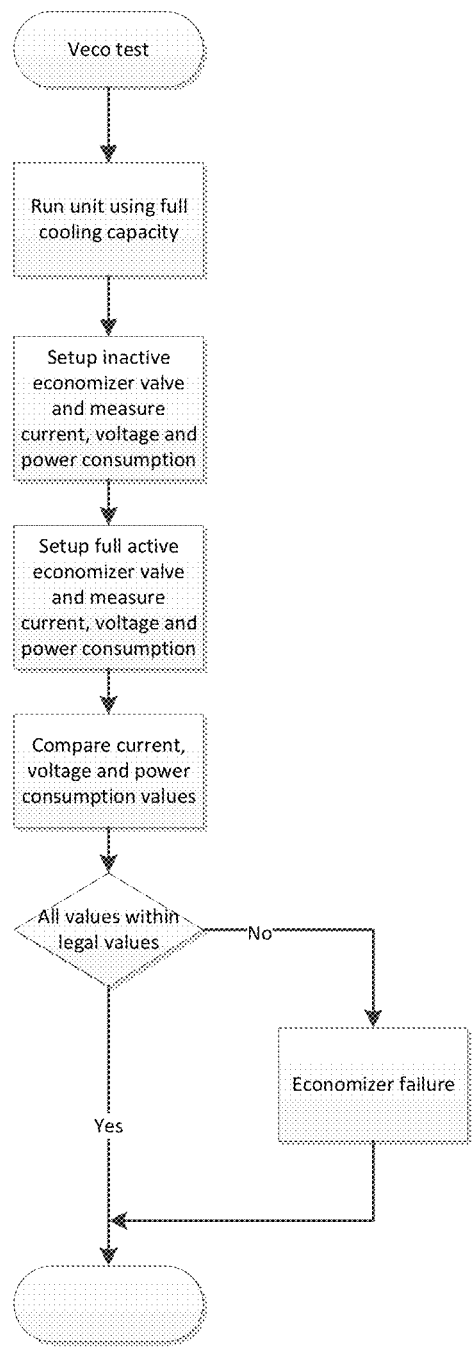
FIG. 4 schematically shows a layout for a test of economizer expansion valve ($V_{eco}$) during operation by full cooling capacity.
Figure 5A:
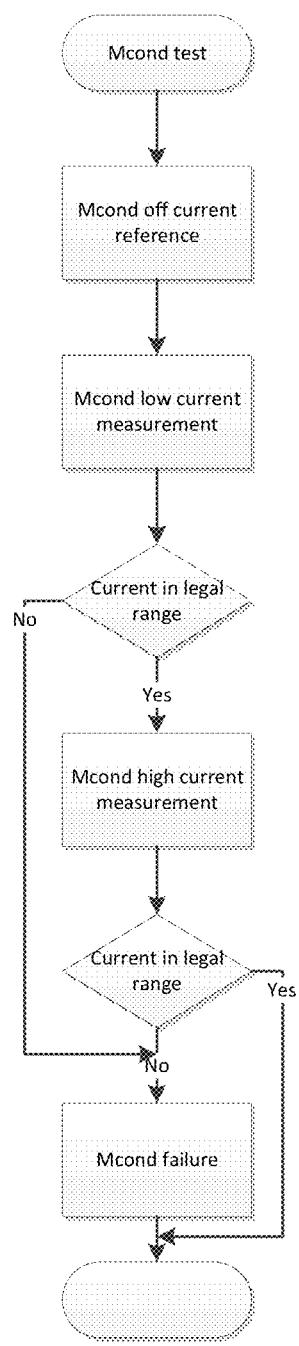
FIG. 5a-e schematically shows embodiments of layouts for tests of motors and heating elements.
Figure 5B:
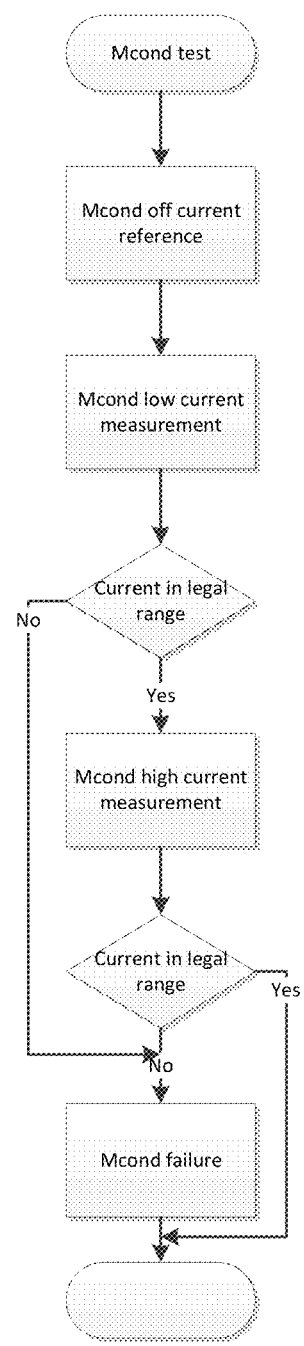
Figure 5C:
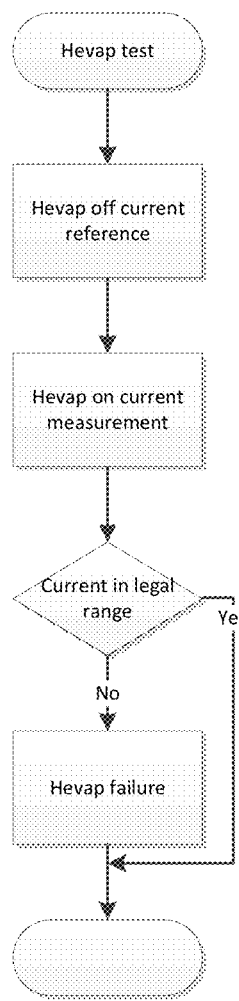
Figure 5D:
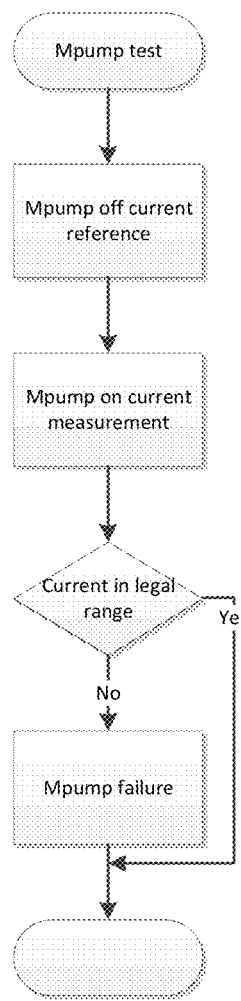
Figure 5E:
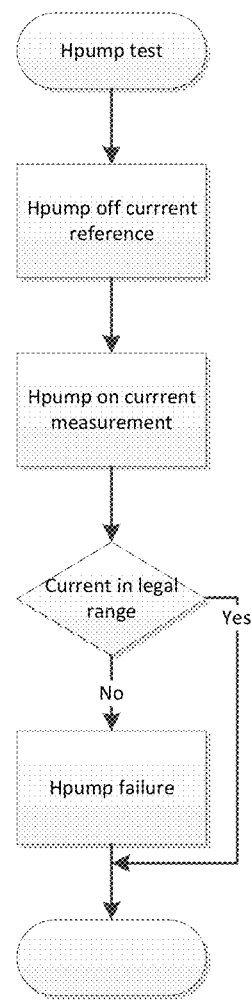

FIG. 4: Economizer expansion valve 16 $V_{eco}$ test during operation by full cooling capacity, where the controller 34 monitors power consumption, voltage and energy consumption in combination on the compressor 1 and the temperature ($T_{fc}$) in the frequency converter 2 in full active $V_{eco}$ mode and in inactive $V_{eco}$ mode. $V_{eco}$ mode is an operating condition utilising sub cooling by directing refrigerant flow to economizer line. These two values are compared and the difference should exceed a preselected level. This test measures the difference in power consumption in order to determine if the economizer function is working sufficiently. In case the power consumption is decreasing when the economizer function is cut off, then the economizer function is working. If there is no difference in the power consumption, the economizer function is not working.

A primary control is temperature readings where one or more of the sensors in relation to $T_{suc}$, $T_{evap}$, $T_{sup1}$, $T_{sup2}$, $T_{ret}$ and $T_0$ are tested. If one or more sensors give readings deviating from the expected level compared to the rest of the sensors in a one to one relations comparison. $T_0$ is a calculated value of a temperature, converted from a pressure value $P_{suc}$. The conversion of $P_{suc}$ to temperature $T_0$ is based on table values of saturated gas and based on a factual relation between a certain media's temperature and pressure, which means that a certain pressure gives a certain temperature. As an example refrigerant R134a can be used, but other suitable refrigerants can be used.

As a secondary control, power consumption can be used.

In an example following values shown in a display or a similar fault indicating component can indicate following fault conditions:

1 indicates that $P_{suc}$ is invalid; 2 indicates that $P_{dis}$ is invalid; 3 indicates that $P_{suc}$ is above $P_{dis}$; 4 indicates a Frequency Converter (FC) emergency; 5 indicates a faulty compressor; 6 indicates lack of refrigerant or a restricted expansion valve ($V_{exp}$).

In an embodiment the system shift to bad reliability state in case one of the following criteria are true:

$T_0/P_{suc}$ pressure sensor is faulty
Unrealistic pressure measurements (e.g. low amount of refrigerant)
Broken valve plates
$V_{exp}$ is faulty
$V_{hg}$ is faulty When all criteria are false, the system will shift back to the applicable state in the faulty sensor detection and identification.

FIG. 5a-5e: Motors and heating elements such as motor ($M_{cond}$) for the condenser fan 8, the evaporator fan 20 motors ($M_{evap1}$, $M_{evap2}$), the evaporator heater 23 ($H_{evap}$), motor (not shown) and heater 430 for vacuum pump 43, which motors and/or heaters all can be tested in a group and by an overall sum of power consumption or by stepwise changes in power consumption it is determined if the individual motor or heater is active by comparing to the by the variation expected power consumption, depending on voltage.

Figure 6:
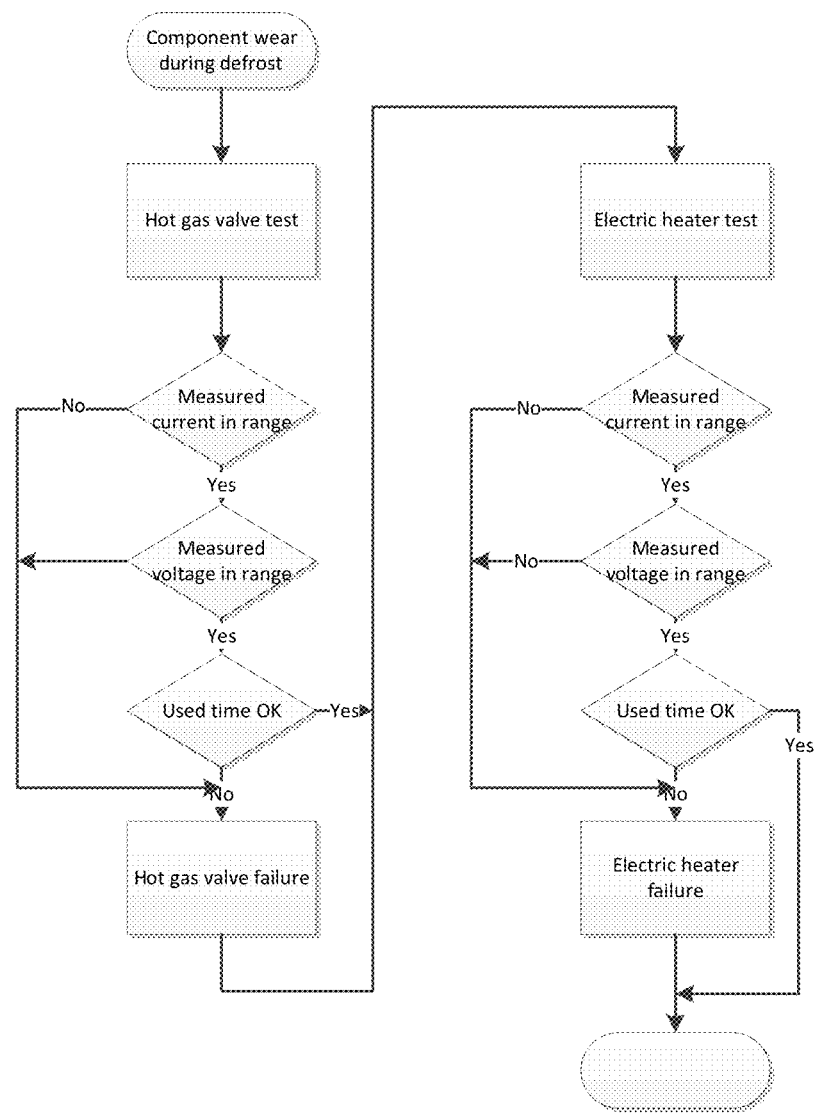
FIG. 6 schematically shows a layout for a test of hot gas valve in combination with heating elements during a defrost process.

FIG. 6: Test of hot gas valve 32 and possibly in combination with heating elements during the defrost process, where the power consumption as well as the voltage is measured, via controller and power measurement devices, on the compressor 1, temperature on the evaporator sensors, power consumption and voltage on the heating elements together with the defrosting time can decide if one or more of the components are faulty or in a stage of wear or operational deterioration. If, for example the hot gas valve is blocked (or compressor valves are broken), then the defrost time will be extended significantly due to the heat input to the evaporator during defrost is reduced to half. Another option is that if heaters are not activated, then $T_{evap}$ 22 will not show an increase at the same rate as $T_{suc}$ 25 and $P_{suc}$ 28, which are both under influence of hot gas. Furthermore, defrost time is extended more than 25% as the heat input is half.

Figure 7:
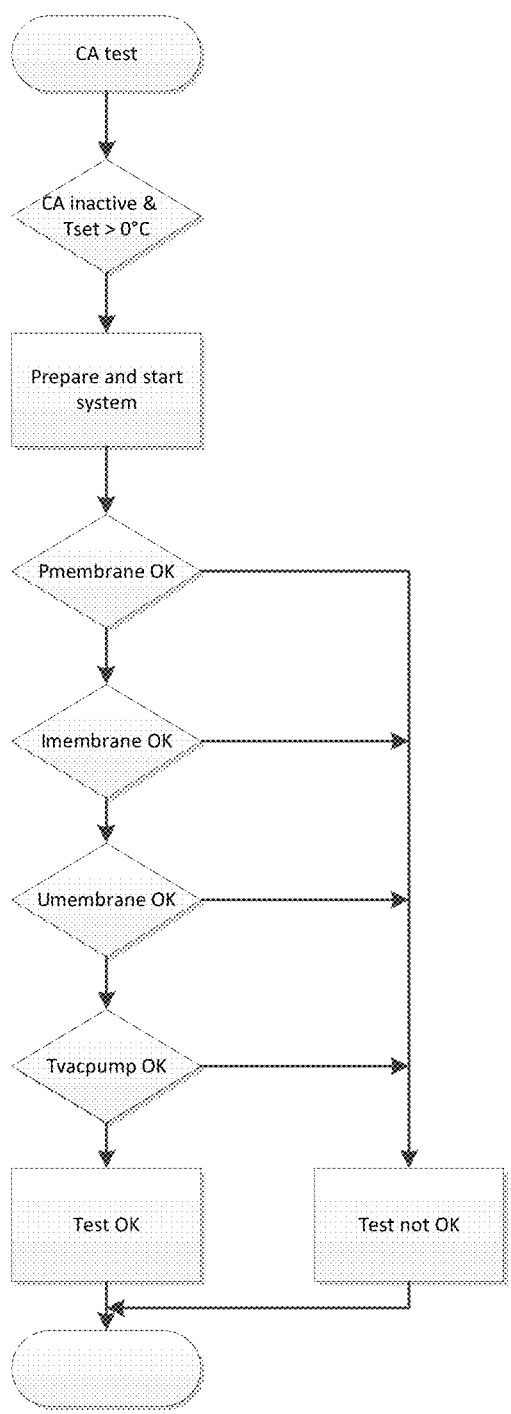
FIG. 7 schematically shows a layout for a test for leaks in a CA (controlled atmosphere) system.

FIG. 7: At a given time where the CA system 42 is not activated and the set point temperature is above 0° C. the CA system 42 can be checked for leaks by that the system is prepared and started with the controller simultaneously monitoring membrane pressure $P_{membrane}$, power consumption $I_{membrane}$, voltage $U_{membrane}$ and the oil temperature $T_{membrane}$ in the vacuum pump 43. The pump motor ($M_{pump}$) and the pump heater 430 ($H_{pump}$), can all be tested in a group and can be determined either by total or by stepwise variations if individual components are active with the expected power consumption according to the variation, depending on the voltage. If pressure is not dropping, and power consumption is measured, there is a fault (for example worn out lamellae in the pump, leak in pipe/hose), if no power consumption measured, the motor is not running, and if pump or motor is blocked, there will be measured a power consumption, but no vacuum is detected.

Figure 8:
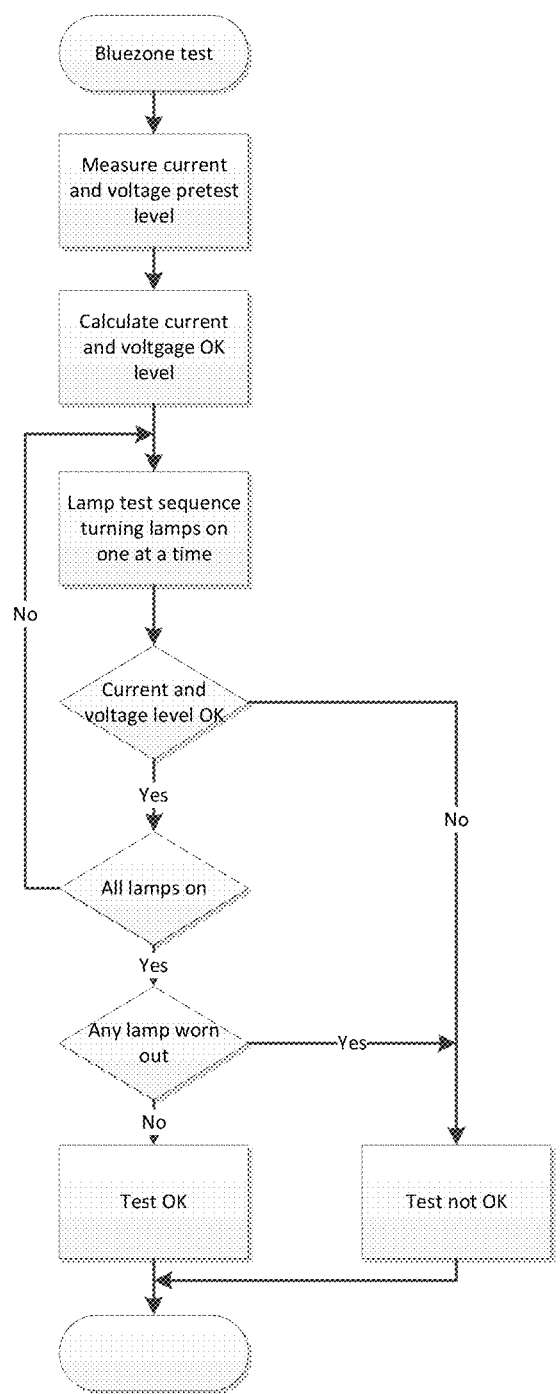
FIG. 8 schematically shows a layout for a test of a Bluezone System or test of lamps for a Bluezone System.

FIG. 8: The Bluezone System 44 can be checked by monitoring power consumption and voltage before, during and after activation of the Bluezone controller 340, and the lamps 45 are activated either all at one time or one by one until all lamps 45 are active. These values are held together and are compared to the glowing time for the lamps 45. Also numbers of attempts for ignition of each of the lamps are monitored. For example, if number of attempts for ignition exceeds four times, the lamp is close to being worn out. Further total glowing time for each lamp is monitored. If an alarm is given the lamp is either ready for replacement within short time, if it can be ignited, otherwise the lamp should be replaced as soon as possible.

Figure 9A:
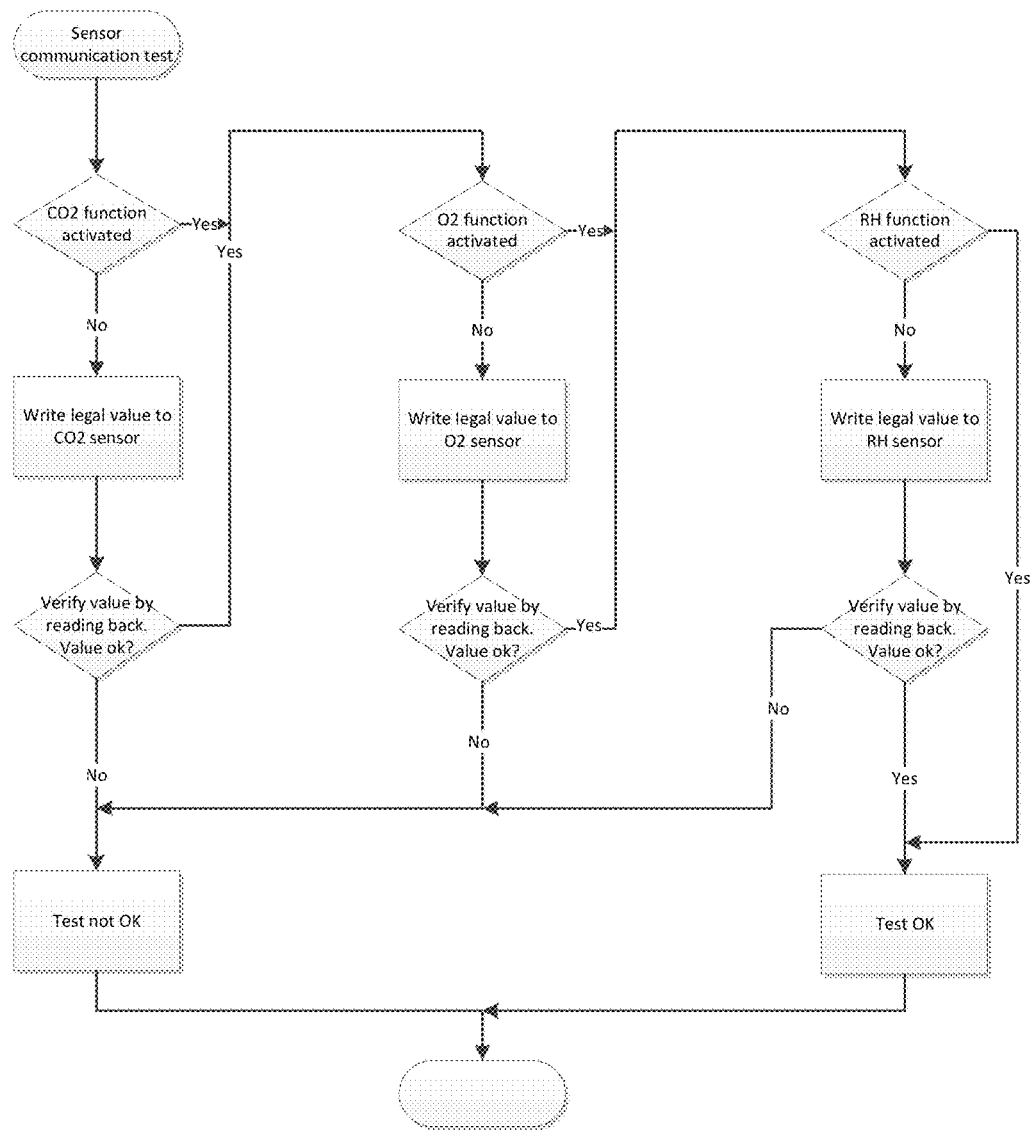
FIG. 9a-b schematically shows layouts for embodiments of tests of communication with sensors for measuring of relative humidity (RH), $CO_2$ level and $O_2$ level.
Figure 9B:
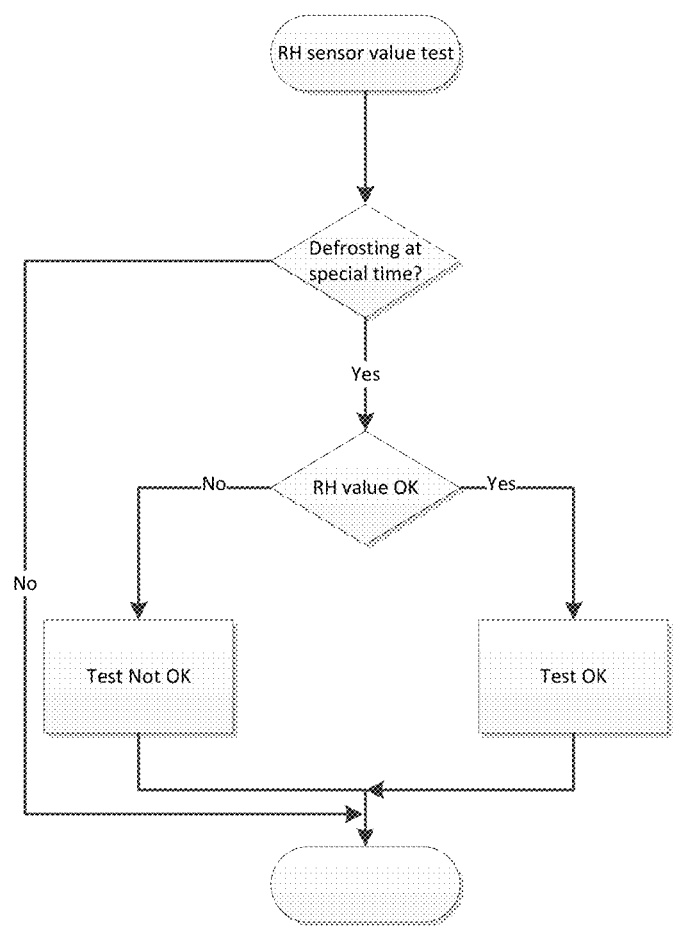

FIGS. 9a and 9b: Check of communication with sensors for measuring of relative humidity (RH), $CO_2$ level and $O_2$ level is checked by reading and writing to different sensors, when their related function is not activated. The RH sensor can further be checked at a defined time during the defrosting process, where the level of moisture is known and the reading therefore should be above a pre-defined value. In an example the Cargo held at a temperature between 3° and 20° Celsius and in another example the Cargo is held at a temperature between 3° and 10° Celsius. It is important for the check that none of the related functions are activated during the check.

Figure 10:
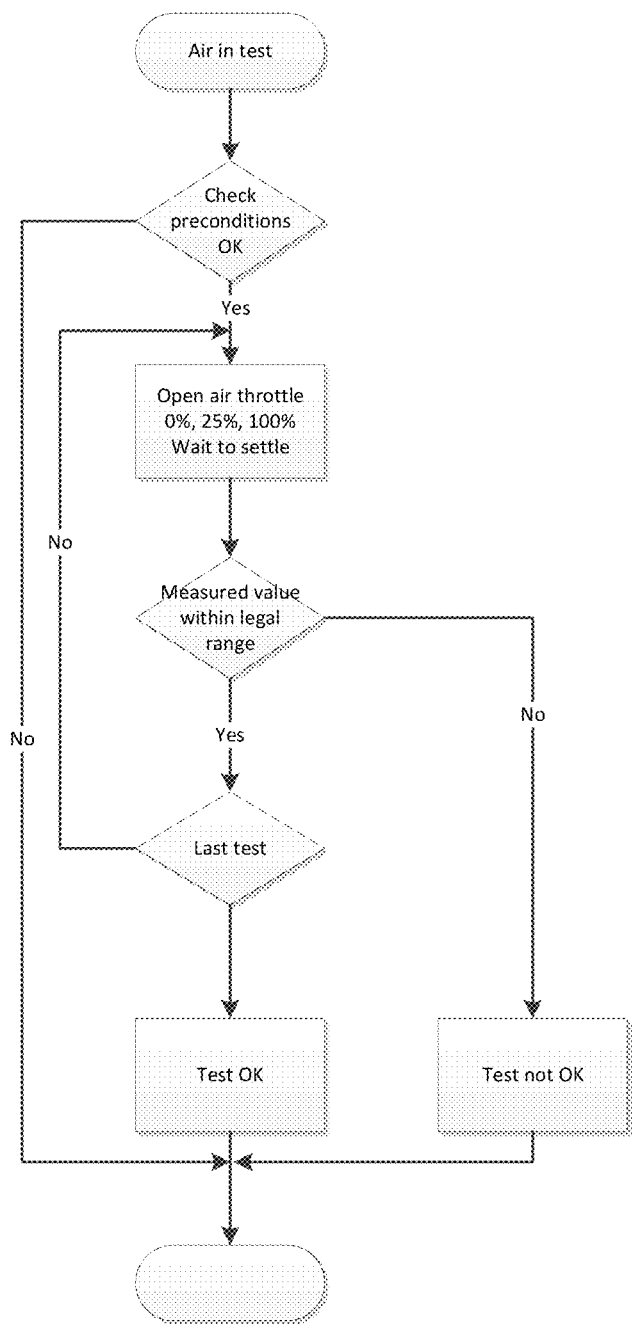
FIG. 10 schematically shows a layout for a test of a fresh air valve.

FIG. 10: If the test satisfies predefined demands, for example when $T_{set}$ is set to Chill mode and Controlled Atmosphere (CA), Advanced Ventilation (AV+), Bluezone, Automatic Ventilation (AV) functions are inactive, then the fresh air module 46 can be checked by opening the valve or throttle by use of the motor control and a step movement of the motor is compared to a flow rate of air measured on an opening degree of the valve or throttle. This test is carried out for one or more opening degrees of the valve or throttle, going from 0 to 100%.

In situations where cargo is shipped under controlled atmosphere (CA), the fresh air module 46 should not be tested since such a test can change the controlled atmosphere in an inexpedient way.

Figure 11:
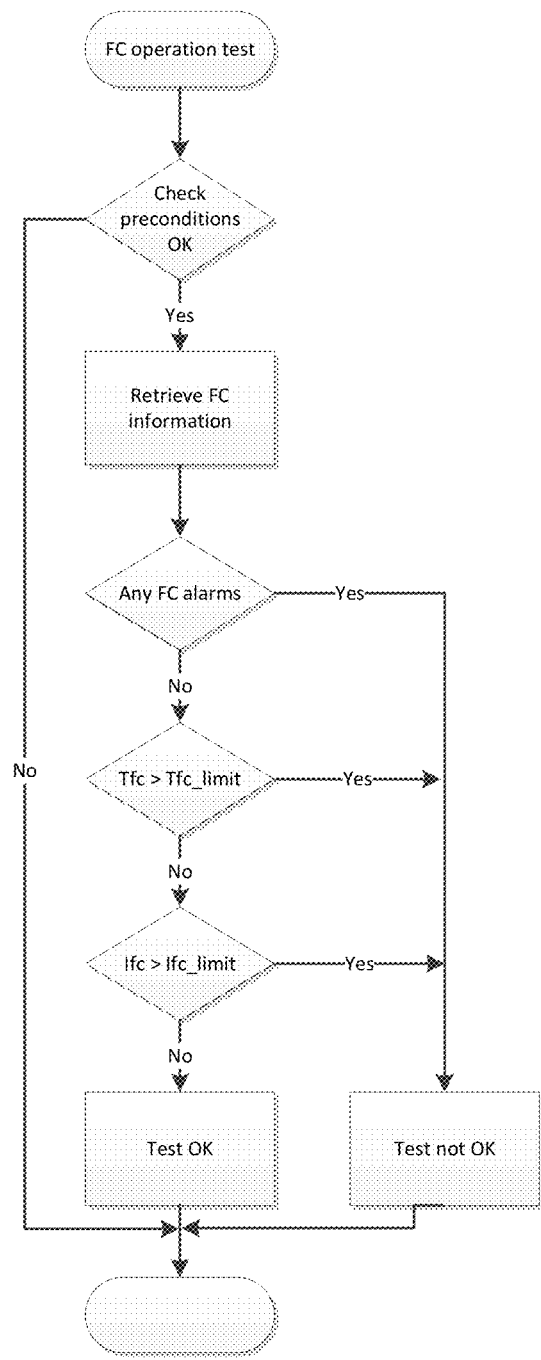
FIG. 11 schematically shows a layout for a test for a frequency converter during operation.

FIG. 11: The frequency converter 2 can be checked during operation, having certain pre-defined conditions met, for example during full cooling capacity and during high operating temperatures, such as for example high ambient temperatures and high supply air or return air temperatures, a considerably lower set point temperature, and a high heat emission from the cargo. Under the above conditions the internal temperature of the drive in the frequency converter 2 ($T_{fc}$) and the drives own alarm signals are monitored. In case no alarm signals occur from the drive, the temperature internal the drive can be raised up to a level near, on level or above level for triggering of an alarm signal to check for a signal from the drive.

Same check can be carried out for power consumption under equally advantageous conditions being during pull down (maximum cooling capacity is being utilised), the ambient conditions are high (temperature is above 30° C. and humidity is higher than 75%) and the cargo temperature set point is more than 10° C. lower than ambient temperature. By controlling the torque on the compressor and frequency converter, by use of $V_{exp}$, the power draw on the frequency converter can be adjusted away from or closer to maximum conditions and the alarm levels and in case the above adjustment cause large changes and unexpected alarm signalling, then it is indicating that the drive has deteriorated.

Figure 12:
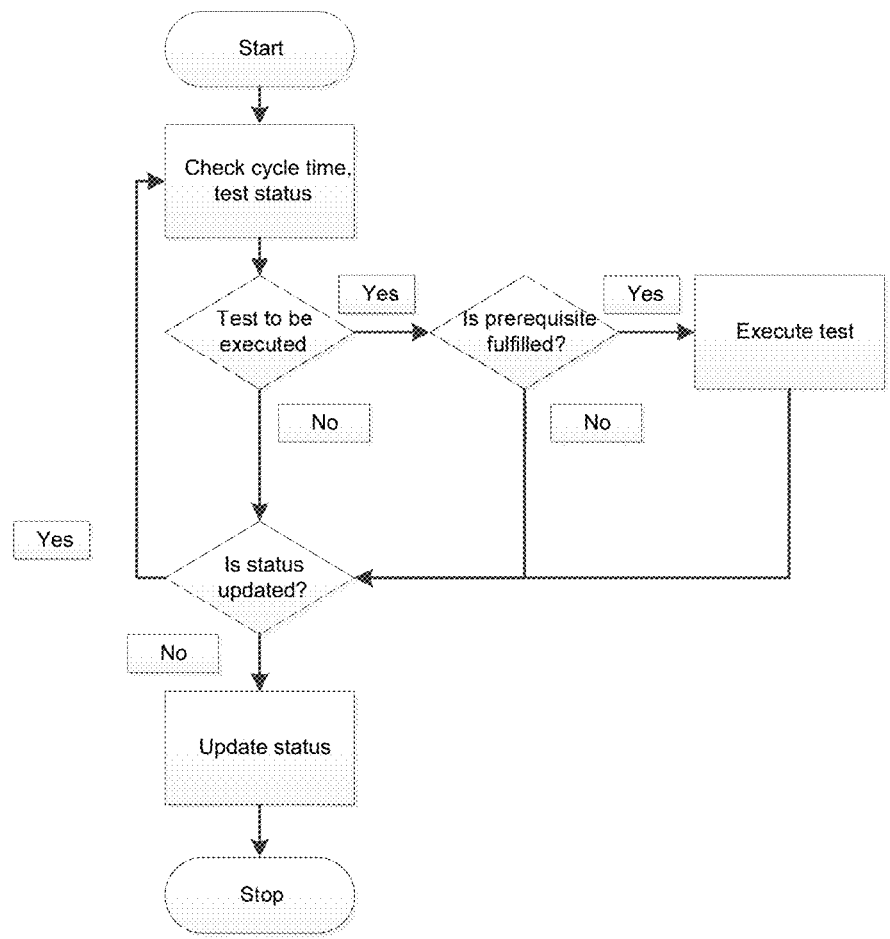
FIG. 12 schematically shows a layout for a general test cycle for the system.

As a kind of "own-check" the controller can impose the system with one or more fault conditions in order to trigger an alarm or warning. Hereby the system and the controller is checked FIG. 12: Here an embodiment of a general test cycle for the system is shown.

When the real time performance check of the container system is carried out without fault indication, the container and its cooling unit is approved.

The invention claimed is:

1. A method for real-time performance check of one or more transport refrigeration units, where each transport refrigeration unit includes a plurality of temperature sensors, the method comprising the steps of:
   iteratively comparing, via a controller of the transport refrigeration unit, a reading of each temperature sensor of the plurality with a reading of a different temperature sensor of the plurality;
   determining, based on the comparisons, whether one or more temperature sensors of the plurality are defective or deviate from expected temperature readings;
   simultaneously measuring/monitoring a mass flow of a cooling agent through a compressor and through an evaporator expansion valve $V_{exp}$;
   determining, by the controller and based on the measuring/monitoring, whether a deviation between the mass flow through the compressor and the mass flow through the evaporator expansion valve $V_{exp}$ exceeds 25%;
   if said deviation exceeds 25%, generating an error signal;
   activating and deactivating one or more components of the transport refrigeration unit and for each component, and
   comparing one or more measurements associated with the one or more components in both activated and deactivated states to thereby determine whether the one ore more components require replacement.

2. A method according to claim 1, further comprising the steps of:
   measuring a suction pressure, $P_{suc}$, of the cooling agent leaving an evaporator;
   converting a value of $P_{suc}$ to a temperature value, $T_0$, based on table values of saturated gas and based on a factual relation between a temperature of the cooling agent and pressure;
   setting $T_0$ as a lower temperature limit to be used in comparing each temperature sensor of the plurality with a different temperature sensor of the plurality;
   if any temperature sensor of the plurality provides a temperature reading lower than $T_0$, generate an error signal or an error message.

3. A method according to claim 1, further comprising the steps of:
   converting a measured suction pressure, $P_{suc}$, to a temperature value, $T_0$, based on table values of saturated gas and based on the factual relation between a temperature of a refrigerant media and pressure;
   determining whether $T_0$ is at or below the readings of temperature sensors of the plurality;
   if two or more sensors provide lower temperature readings than $T_0$, generating a signal or error message, that a $P_{suc}$ transmitter is not measuring correctly.

4. A method according to claim 1, further comprising the steps of:
   deactivating a condenser fan during a normal cooling situation, alternatively by an In-Range situation;
   testing a condenser pressure sensor ($P_{dis}$), a high pressure switch (emergency equipment), a temperature sensor that measures the ambient temperature, and a temperature sensor that measures a temperature of a controller print board;
   adjusting a cooling circuit setting in such a way as to raise a temperature of a condenser to a level that in turn causes the high pressure switch to activate;
   at the same time measuring the condenser pressure sensor, $P_{dis}$; and
   afterwards, cooling the condenser to a level, depending on the mode of operation, whereby the temperature sensors are compared in relation to each other.

5. A method according to claim 1, further comprising the steps of:
   testing of a High Pressure Group, which involves condenser pressure sensor ($P_{dis}$), high pressure switch (emergency equipment) and temperature sensors for the ambient temperature and controller print board by stopping a condenser fan during a normal cooling situation where by use of a cooling circuit, the condenser temperature is raised to a level activating the high pressure switch;
   at the same time the condenser pressure sensor $P_{dis}$ is measured; and
   afterwards, the condenser is cooled to a level, depending on the mode of operation, whereby the temperature sensors are compared in relation to each other.

6. A method according to claim 1, further comprising the steps of:

testing of a High Pressure Group, which involves condenser pressure sensor ($P_{dis}$), high pressure switch (emergency equipment) and temperature sensors for the ambient temperature and controller print board by stopping a condenser fan during an In-Range situation, where by use of a cooling circuit, the condenser temperature is raised to a level activating the high pressure switch;

at the same time the condenser pressure sensor, $P_{dis}$, is measured; and afterwards, the condenser is cooled to a level, depending on the mode of operation, whereby the temperature sensors are compared in relation to each other.

7. A method according to claim 1, further comprising the steps of:

testing an economizer expansion valve, $V_{eco}$, during operation at a maximum cooling capacity;

monitoring, via the controller, power consumption, voltage, and energy consumption in combination on the compressor and the temperature in the frequency converter ($T_{fc}$) in full active $V_{eco}$ mode and in inactive $V_{eco}$ mode;

comparing the values monitored during active $V_{eco}$ mode and the values monitored during inactive $V_{eco}$ mode to one another, to confirm that differences between corresponding values of the two modes do not exceed preselected levels.

8. A method according to claim 1, further comprising the step of:

determining power consumption associated with motors and heating elements individually or as a group; and comparing the power consumption to an expected power consumption to thereby determine whether an individual motor or heater is active.

9. A method according to claim 1, further comprising the steps of:

testing of a hot gas valve in combination with heating elements during a defrost process;

measuring the power consumption as well as the voltage, via controller and power measurement devices on the compressor;

measuring temperature on the evaporator sensors;

measuring power consumption and voltage on the heating elements together with the defrosting time; and determining if one or more of the components are faulty or in a stage of wear or operational deterioration.

10. A method according to claim 1, further comprising the steps of:

testing a hot gas valve in combination with heating elements during a defrost process;

when an internal evaporator temperature, $T_{evap}$, does not increase at a same rate as a temperature of a suction side of the evaporator, $T_{suc}$, and a rate of a pressure of a suction side of the evaporator, $P_{suc}$, generating an error signal or error message to indicate that the hot gas valve is faulty.

11. A method according to claim 1, further comprising the steps of:

at a given time when a CA (Controlled Atmosphere) system of the transport refrigeration unit is not activated and a set point temperature is above 0° C., preparing and starting the system to thereby check the CA system for leaks; and simultaneously monitoring, by a controller of the transport refrigeration unit, a membrane pressure, a power consumption, a voltage and an oil temperature associated with a vacuum pump of the transport refrigeration unit.

12. A method according to claim 1, further comprising the steps of:

testing a Bluezone system by monitoring power consumption and voltage before, during and after activation of a Bluezone controller of the Bluezone system;

activating lamps either one at a time or one by one until all lamps are active to thereby cause the lamps to enter an activation state;

maintaining the activation state of the lamps and comparing an amount of time each lamp is illuminated to an amount of time a different lamp is illuminated;

monitoring a number of attempts for ignition of each of the lamps and total illumination time for each lamp;

if the number of attempts for ignition exceeds a preselected number, or the total illumination time for each lamp exceeds a preselected value, generating an alarm.

13. A method according to claim 1, further comprising the step of:

checking communication with sensors for measuring of relative humidity (RH), $CO_2$ level and $O_2$ level by reading and writing to individual sensors, when values generated by the sensors are not being used for other processes of the transport refrigeration unit.

14. A method according to claim 1, further comprising the steps of:

checking a reading of a relative humidity (RH) sensor by comparing to a pre-defined value at a defined time during a defrosting process, where a level of moisture is known and the reading is presumed to be above the pre-defined value, wherein the checking is carried out when $CO_2$ and $O_2$ level control functions are deactivated.

15. A method according to claim 1, further comprising the steps of:

setting a setpoint temperature, $T_{set}$, of the transport refrigeration unit to Chill mode;

setting a controlled atmosphere (CA) function, advanced ventilation (AV+) function, a bluezone function, and an automatic ventilation (AV) function to inactive;

stepwise opening the evaporator expansion valve by use of a motor control from 0 to 100%;

at each step, comparing a flow rate of air through the evaporator expansion valve to pre-determined flow rate values associated with different opening degrees of the evaporator expansion valve to thereby check the functionality of the fresh air module.

16. A method according to claim 1, further comprising the steps of:

checking a frequency converter during operation, having one or more following pre-defined conditions met:
during full cooling capacity;
during high operating temperatures;

monitoring an internal temperature of a drive ($T_{fc}$) and the drive's own alarm signals;

in case no alarm signals occur from the drive, raising the internal temperature of the drive up to a level near, on level, or above level for triggering of an alarm signal to check for a signal from the drive.

17. A method according to claim 1, further comprising the steps of:

monitoring a temperature ($T_{fc}$) of a frequency converter and alarm signals generated by the frequency converter when the transport refrigeration unit is operating at an ambient temperature above 30° C., and a humidity higher than 75%, where the cargo temperature set point is more than 10° C. lower than ambient temperature;

adjusting an evaporator expansion valve, $V_{exp}$, to thereby control the torque on the compressor and frequency converter such that the power draw on the frequency converter is adjusted away from or closer to maximum power draw conditions, wherein generation of an alarm by the frequency converter during adjustment is indicative of frequency converter deterioration.

18. A method according to claim 1, wherein the transport refrigeration unit is configured to generate one or more fault conditions in order to trigger an alarm or warning to check the transport refrigeration unit.

* * * * *

UNITED STATES PATENT AND TRADEMARK OFFICE
CERTIFICATE OF CORRECTION

PATENT NO. : 10,228,188 B2  
APPLICATION NO. : 15/178125  
DATED : March 12, 2019  
INVENTOR(S) : Ole Thogersen et al.

Page 1 of 1

It is certified that error appears in the above-identified patent and that said Letters Patent is hereby corrected as shown below:

In the Claims

In Column 10, Claim 1, Lines 6-7, immediately after "whether the" and immediately before "components", please delete "one ore more" and insert --one or more--.

Signed and Sealed this  
Fifth Day of May, 2020

Andrei Iancu  
*Director of the United States Patent and Trademark Office*